W. H. OTTO & P. KORPER.
Beer Forcing Apparatus.

No. 123,639.   Patented Feb. 13, 1872.

Witnesses:
P. C. Dietsch
Geo. W. Mabee

Inventor:
W. H. Otto
P. Korper
PER
Attorneys.

123,639

UNITED STATES PATENT OFFICE.

WILLIAM H. OTTO AND PETER KORPER, OF TREMONT, PENNSYLVANIA.

IMPROVEMENT IN BEER-FORCING APPARATUS.

Specification forming part of Letters Patent No. 123,639, dated February 13, 1872.

Specification describing certain Improvements in Beer-Forcing Apparatus, invented by WILLIAM H. OTTO and PETER KORPER, of Tremont, in the county of Schuylkill and State of Pennsylvania.

Figure 1:
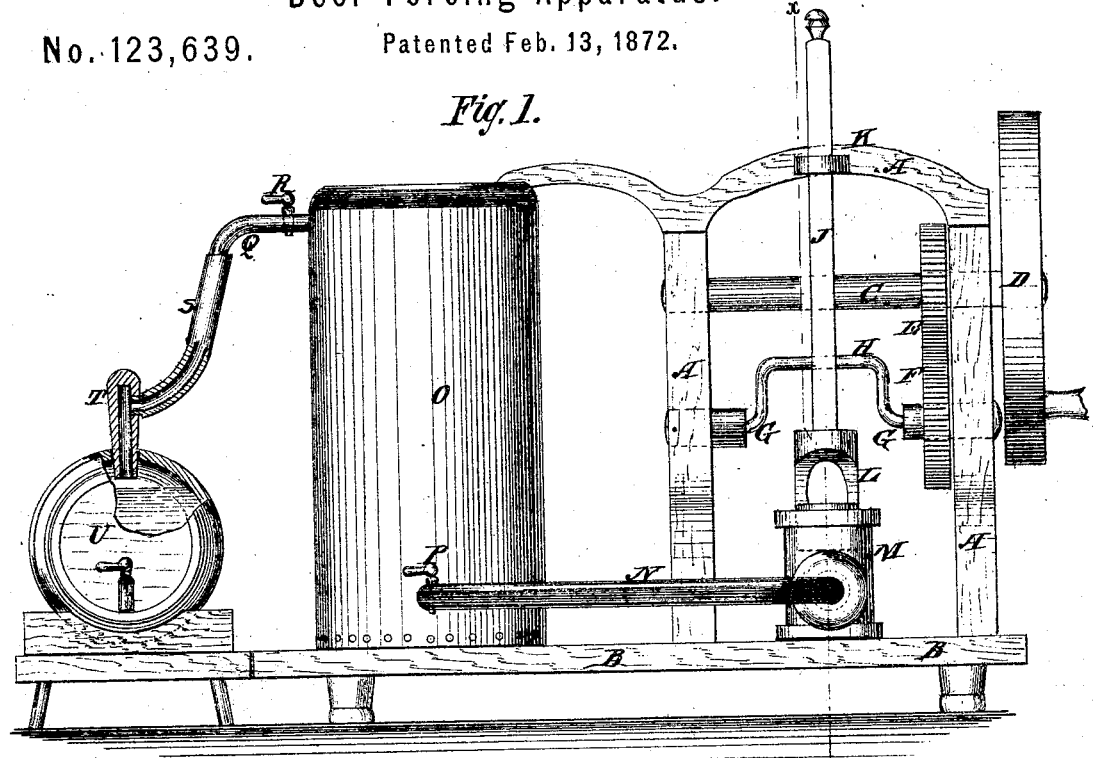
Figure 2:
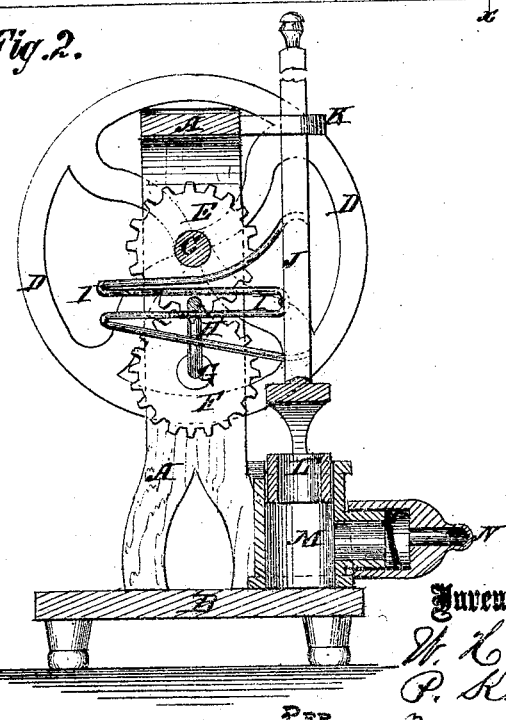

Figure 1 is a side view of our improved apparatus. Fig. 2 is a detail sectional view of the same taken through the line $x\ x$, Fig. 1.

Similar letters of reference indicate corresponding parts.

Our invention has for its object to furnish an improved apparatus for forcing beer out of the keg, and which shall be simple in operation, convenient in use, and effective in operation; and it consists in the construction and combination of the various parts of the apparatus, as hereinafter more fully described.

A represents a frame-work, attached to a bench, B, or other suitable support. In bearings in the upper part of the frame A revolves a shaft, C, to one end of which is attached a crank-wheel, D. To the shaft C is attached a gear-wheel, E, the teeth of which mesh into the teeth of the gear-wheel F, attached to the crank-shaft G. The shaft G revolves in bearings in the frame A, and upon its middle part is formed a crank, H, which enters the slot of the slotted arm or bracket I, attached to the piston-rod J, so as to work the piston by the revolution of the crank H. The piston-rod J works up and down in a guide, K, attached to the frame A, to cause the said rod to move up and down in a vertical line. To the lower end of the rod J is attached the piston L, which works up and down in the pump-barrel M, attached to the bench or support B, and from which the compressed air is conducted through a pipe, N, to the receiver O, which is made air-tight and is placed upon the bench B, or other support. The pipe N is provided with a stop-cock or valve, P, to confine the air in the receiver O. To the upper part of the receiver O is attached a short pipe, Q, which is provided with a stop-cock, R, so that the compressed air may be allowed to escape from the receiver O, as may be required. S is a flexible hose or pipe, which may be of any desired length, and one end of which is connected with the end of the pipe Q. The other end of the flexible pipe S is connected with a metallic bung, T, which is to be inserted in the bung-hole of the beer-keg U.

By this construction, by opening the stop-cock R and the faucet of the beer-keg, the beer will be forced out violently from said keg. By this construction the beer-keg may be placed at any desired distance from the operating parts of the apparatus, which said operating parts may be placed beneath the bar, or in any other convenient place.

Having thus described our invention, we claim as new and desire to secure by Letters Patent—

The combination of the frame A, shaft C, crank-wheel D, gear-wheels E F, crank-shaft G H, slotted arm I, piston-rod J, guide K, piston L, pump-barrel M, pipe N, stop-cock or valve P, air-receiver O, pipe Q, stop-cock R, flexible pipe S, and metallic bung T, said parts being constructed and operating in connection with each other substantially as herein shown and described, and for the purpose set forth.

WILLIAM H. OTTO.
PETER KORPER.

Witnesses:
WM. GANET,
SETH A. ZIMMERMAN.